Jan. 19, 1965    A. F. GREENFIELD    3,166,374
TAMPER-PROOF METER

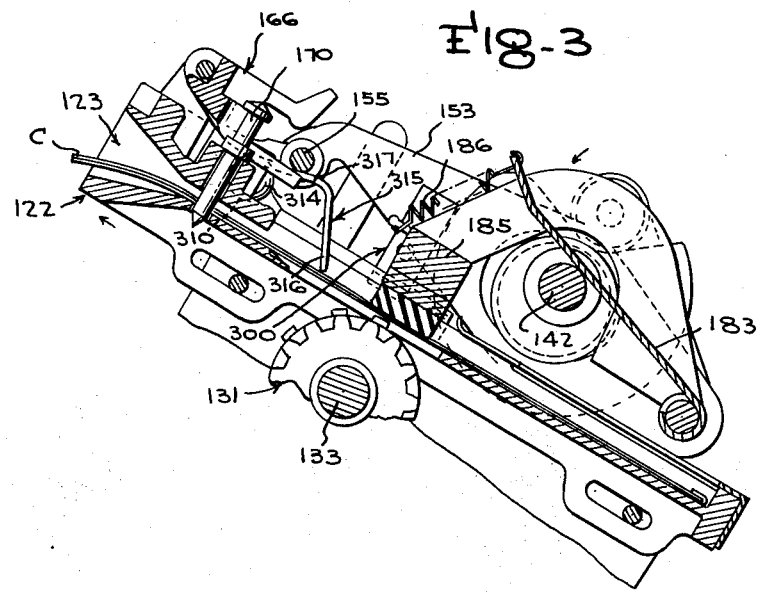
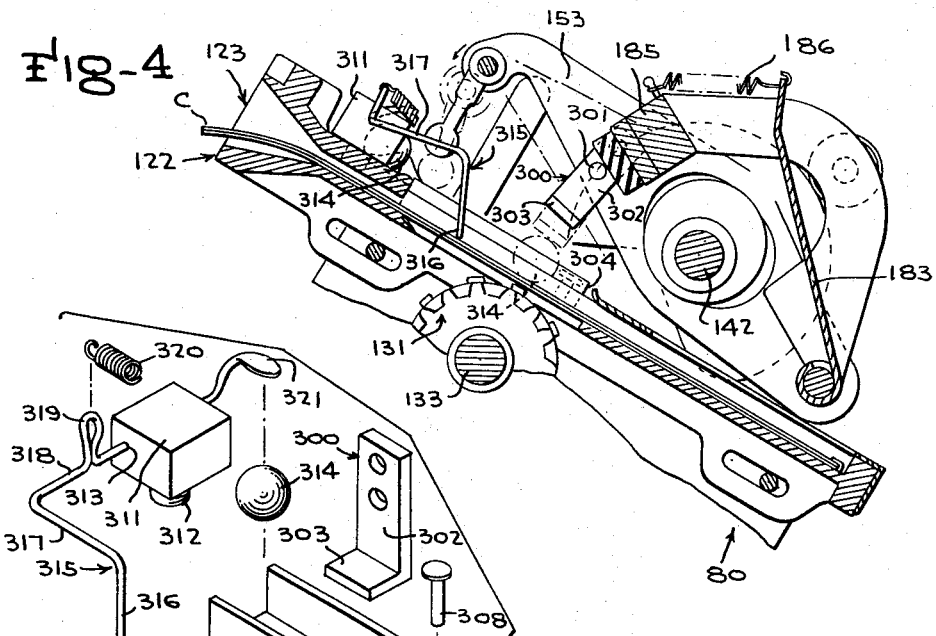
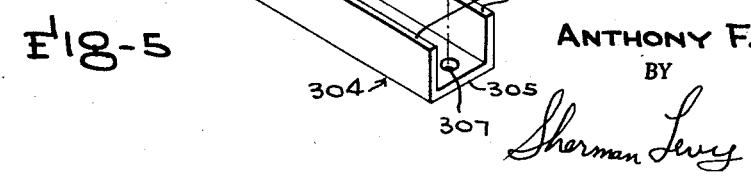

Filed Feb. 20, 1963    4 Sheets-Sheet 4

INVENTOR.
ANTHONY F. GREENFIELD
BY
Sherman Levy    ATTORNEY 3,166,374
TAMPER-PROOF METER
Anthony F. Greenfield, 2905 Frederick Ave., Baltimore, Md., assignor of one-half to Herman M. Gittleman, Baltimore, Md.
Filed Feb. 20, 1963, Ser. No. 259,849
7 Claims. (Cl. 346—104)

The present invention relates to a tamper-proof meter, and more particularly to such a meter for fuel oil or gas dispensing trucks.

An object of the present invention is to provide a tamper-proof meter which is constructed so as to prevent fraud during delivery of fuel oil or gas.

Another object is to provide a tamper-proof meter which includes a register and prints a receipt or ticket that shows the gallonage readings before and after delivery, and wherein the ticket is locked in the registry during delivery to prevent fraud or mistakes, so that the present invention will function as a positive guard against illegitimate deliveries from the truck and against false or misleading recording, registering, printing or the like, whereby a printed record will be made to indicate the quantity of fluid that has passed through the meter so that persons buying or selling fluid will have an accurate printed account or record of the quantity of fluid that has been metered.

Another object is to provide an apparatus of the character described that may be utilized speedily and with precision by even inexperienced operators.

Further objects and advantages are to provide improved elements and arrangements thereof in a device of the character described that is economical to produce, durable in form, and conducive to the most economical use of materials and uniformity of members formed therefrom.

Still further objects and advantages will be come apparent in the subsequent description in the specifications.

In the drawings:

FIG. 3 is a sectional view illustrating certain constructional details of the present invention.

FIG. 4 is a view generally similar to FIG. 3 but showing the parts in a different or adjusted position.

FIG. 5 is a fragmentary perspective view showing the parts disassembled or separated and illustrating the tamper-proof mechanism of the present invention.

Figure 1:
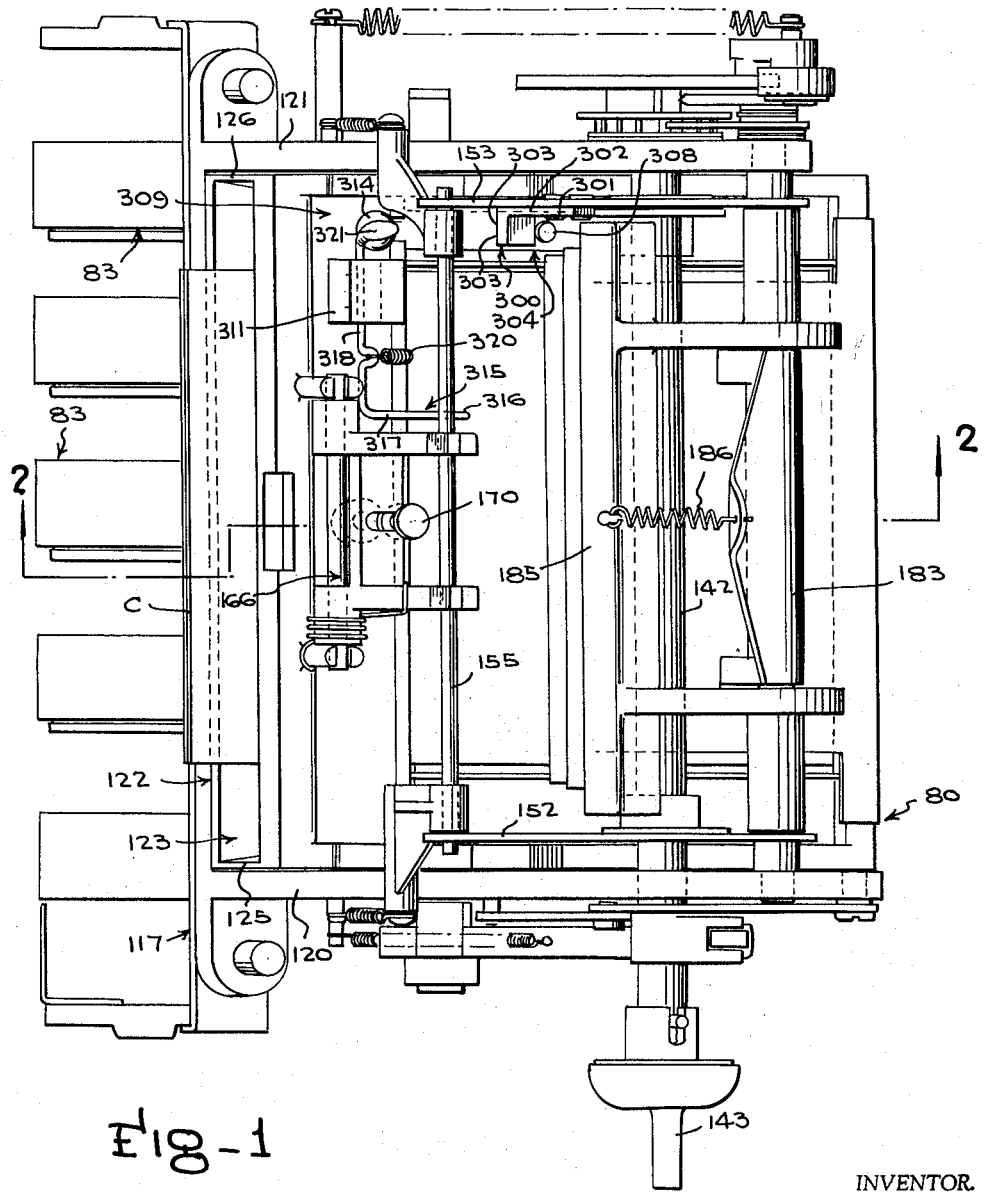
FIG. 1 is a top plan view illustrating the tamper-proof meter of the present invention.

Referring in detail to the drawings, there is illustrated a meter which may be of the type shown in prior Patent 2,707,577, and wherein there is set forth in this prior patent a detailed description of the operation and construction of certain of the conventional parts thereof and hence it is not thought necessary to describe in detail that portion of the construction and operation which is set forth in such prior art. Thus, it will be seen that as shown in the drawings and as shown in this prior patent, the numeral 80 indicates the meter recording mechanism, and the numeral 117 indicates the frame which includes the side plates 120 and 121, and the numeral 131 indicates a numbered printing teeth wheels, while the numerals 133 indicates a cross head, and the numeral 185 indicates a platen. The numeral 186 indicates the spring, and the numeral 122 indicates the carriage and the carriage 122 has a transverse throat portion 123 as well as the side flanges 125 and 126, FIG. 1.

There is further provided a punch frame 166, a punch pin 170, a rock shaft 155, and the leter C indicates a card or sales ticket. The numeral 83 indicates the meter register indicating wheels, and the numerals 152 and 153 indicate a pair of rocker frame members the same as set forth in prior Patent 2,707,577.

According to the present invention there is provided an improvement which makes this prior art type of meter as well as other types of meters tamper-proof so that fraud or errors in delivering fuel oil or the like are prevented, and it will be seen that according to the present invention this is accomplished as follows. A bar of substantially L-shape 300 is secured to the rocker frame member 153 in any suitable manner, as for example by means of securing elements 301, and the bar 300 includes an upstanding portion 302 as well as a lower transverse portion 303.

Figure 6:
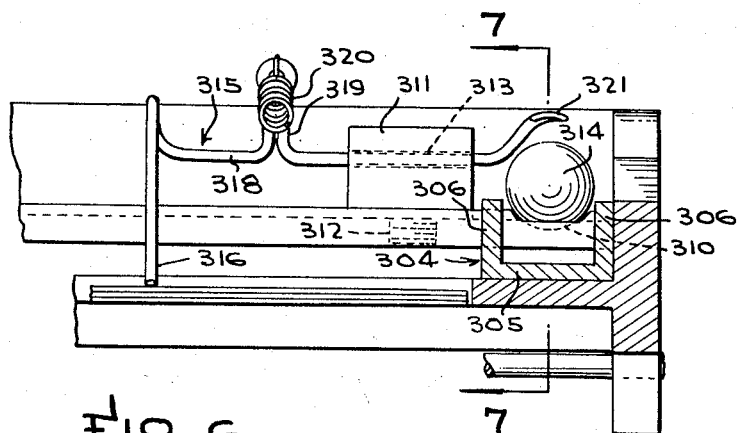
FIG. 6 is a sectional view taken on the line 6—6 of FIG. 2.

The numeral 304 indicates a U-shaped channel member which is supported by the carriage 122, and the channel member 304 includes a lower portion 305 as well as a pair of spaced parallel vertically disposed side portions 306, FIG. 6. The lower end portion of the channel member 304 is adapted to be provided with an opening or aperture 307 therein, FIG. 5, whereby a stop member or stop pin 308 can be extended down through the opening 307 for a purpose to be later described.

The carriage 122 includes a top wall portion 309 which has a recess or indentation 310 therein which defines a seat. The numeral 311 indicates a block or support member which has an integral threaded stud 312 that depends therefrom, and the stud 312 is adapted to be arranged in threaded engagement with a suitable aperture or opening in the portion 309 so as to provide a means for securing the block 311 to the carriage. The block 311 is provided with an opening or aperture 313 therein. The numeral 314 indicates a ball which is adapted to selectively engage or be received in the indentation 310.

As shown in the drawings there is provided a bracket or body member which is indicated generally by the numeral 315, FIG. 6, and the body member 315 includes a first straight portion 316 as well as a second portion 317, and the portion 317 is arranged angularly with respect to the portion 316. There is further provided a third portion 318 which is arranged at an angle with respect to the portion 317, and the portion 318 may be provided with an integral shoulder or projection 319 for engagement by a spring member or weighted member 320 that helps urge or bias the member 315 in the proper direction. The portion 318 is swivelly or rotatably mounted in the opening 313 in the block 311, and an end of the portion 318 terminates in an offset flattened end portion 321 which has a generally arcuate formation for selectively engaging the ball 314 when the ball is in the seat 310 as shown in FIG. 7.

In the drawings the numeral 133 indicates a shaft for the printing type wheels 131, and the numeral 142 indicates the crank shaft which is provided with a crank handle 143, the same as in prior Patent 2,707,577. While reference has been made to this prior Patent 2,707,577 as one type of meter that is adapted to be used with the present invention, it is to be understood that the present invention is not limited to the construction shown in this prior patent and this prior patent has been referred to herein by way of example only, since the present invention is adapted to be used with various types or makes of meters.

From the foregoing, it will be seen that there has been provided a tamper-proof meter for use on fuel oil, gas dispensing trucks or the like, and wherein the present invention will serve to effectively prevent the truck driver from cheating the customer. The present invention is safeguarded against tampering so that the printed record will be accurate, and the present invention is simple in construction and will not cause any loss of time by the person controlling the fluid being delivered through the meter.

Figure 7:
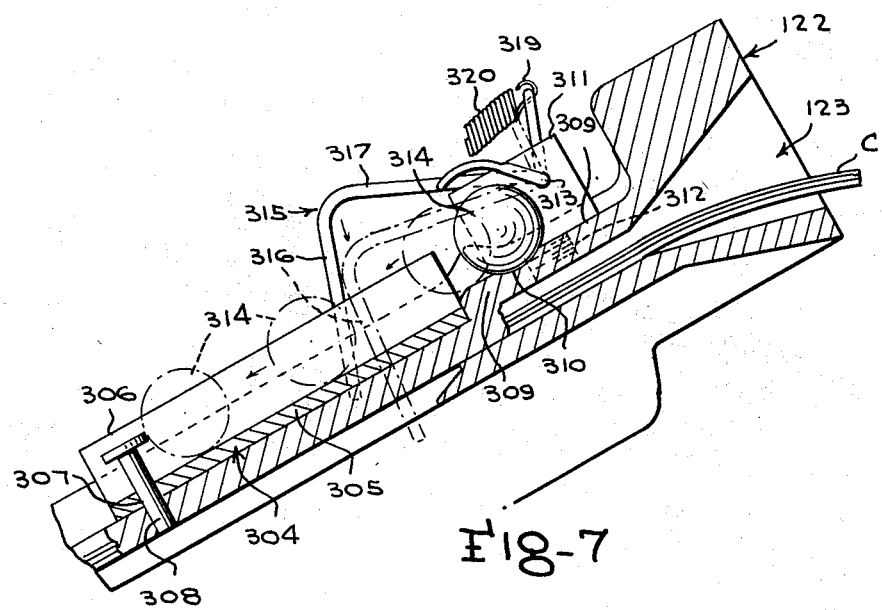
FIG. 7 is a sectional view taken on the line 7—7 of FIG. 6.

The present invention includes the ball 314 which is arranged so that motion resulting from traveling of the truck carrying the device will shake or move the ball 314 from its seat 310 as, for example, from the solid line position shown in FIG. 7 to the broken line position of FIG. 7 so that normal operation or functioning of the meter will be prevented, and this arrangement in conjunction with the associated parts makes the meter tamperproof and prevents fraud or errors during delivery of fuel oil or other fluid. Thus, the dealer and purchaser will have a positive assurance that the proper quantity of liquid purchased has been delivered, and the present invention will insure accuracy and help prevent errors from carelessness or other reasons as well as preventing fraud. With the present invention a sales slip or ticket will be printed and this will show the customer and dealer the exact quantity of fluid that has been dispensed to the particular customer.

The punch pin 170 is adapted to pierce the sales slip or ticket C, immediately before the initial downward stroke of the platen 185 so as to make the first imprint in the sales slip or packet C by the number type wheel 131 therebeneath in order to insure that the punch pin 170 will not be lifted clear of the sales slip C until after a second downward movement of the platen 185 and this results in a second imprint being made on the sales slip by the number type wheels therebeneath.

The crank handle 143 is adapted to be manually operated to rotate the crank shaft 142 in order to reciprocate the sales slip carriage 122 between its two printing positions. After the operator has inserted the sales slip or card C, a turn of the handle 143 and this causes movement of the carriage. The card C is pierced by the pin 170 before the numerals are imprinted on the card so that the truck driver cannot remove the card after the serial number and numbers on the wheels 131 have been imprinted thereon and before the card is locked in the carriage 122 by the punch pin 170. The operator then dispenses the desired amount of fuel oil or the like through the usual nozzle and then he turns the handle 143 a second time and this causes the platen 185 to again strike a blow on the sales slip C and this causes the sales slip to be imprinted with the numerals on the wheels 131.

With prior art devices it has been possible for the operator or truck driver to cheat or perpetrate a fraud on the customer as, for example, by moving the truck or other vehicle to another location and dispensing fuel therefrom before removing the card or sales slip, but with the present invention this is not possible, for the following reason. After the pin 170 initially pierces the ticket C, the card or ticket C cannot be pulled out of the carriage 122 without tearing or destroying the ticket since the pin 170 is still in extended position through the ticket C as shown in FIG. 3.

Figure 2:
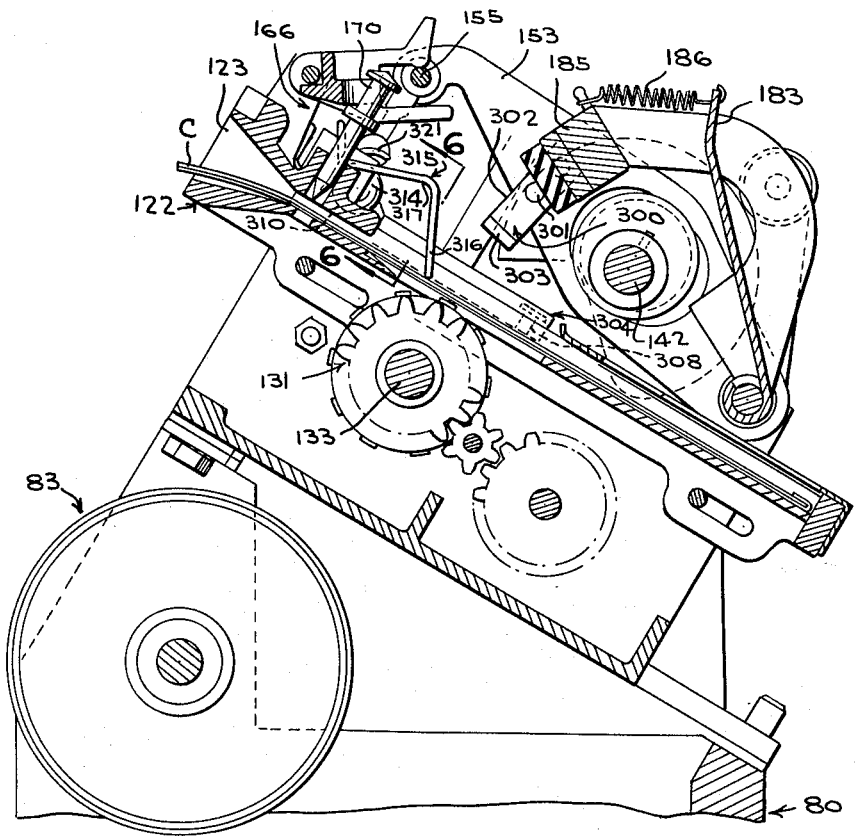
FIG. 2 is a sectional view taken on the line 2—2 of FIG. 1.

One way in which some drivers have perpetrated a fraud or cheated customers is to make a stop at a particular location and discharge or dispense a certain amount of fuel oil, and then drive to the next house or locality, all the while leaving the ticket in the carriage, and then at the next locality, the driver dispenses some more fuel oil and then the crank 143 is manually actuated for the second time. However, with the present invention, initially when inserting the card or ticket C, the parts are arranged so that the pin 170 is in raised position as, for example, shown in FIG. 2, and then as the ticket C is inserted in through the throat 123 into the carriage 122, the ticket will engage the portion 316 of the body member 315 so as to pivot the member 315 in a counterclockwise direction about an axis extending through the opening 313 and this will have the effect of raising or lifting the portion 321 up off of the ball 314. When the portion 321 is in the lowered position it firmly engages the upper end of the ball 314 so that the ball 314 cannot be joggled or shaken lose from its seat 310 although with the portion 321 in raised position above the ball 314, if the driver attempts to perpetrate a fraud by driving from one location to another with the ticket still in the carriage, then the ball 314 will be shaken loose from its seat 310 by the movement of the vehicle and this ball will then roll down into the channel member 304 and then when the driver attempts to complete the cycle by further rotation of the crank 143, the portion 303 of the bar 300 will be brought down into engagement with the ball 314 therebelow so that the mechanism will not function. With the ball 314 in position below the bar 300, the crank 143 cannot be turned since the portion 303 will strike or engage the ball when turning movement of the crank is attempted.

Furthermore, in order to return the ball 314 back to its proper position on the seat 310, it is necessary to disassemble the apparatus and remove the usual cover of the meter and this will require the services of a special mechanic with a pick or other proper tool to remove the ball 314 from its dislodged position and this will act as a further deterrent to cheating by the truck driver or delivery man.

The member 315 includes the portion 316 that is normally arranged in the path of the ticket C, but when the ticket is properly inserted in the carriage, the ticket engages the portion 316 and raises the portion 316 which pivots or swivels the member 315 due to the fact that the portion 316 is swivelly arranged in the aperture 313 of the block 311, and since the gripping portion 321 is integral with the member 315, it will be seen that insertion of the ticket will raise the portion 321 from the ball when the ball is on the seat 310 so that if the driver attempts to drive away with the ticket in the carriage, the ball will be readily shaken loose and the ball will then move into a position to jam the mechanism and prevent further use of the device until the ball is returned to its seat by duly authorized personnel. The member 320 functions as a balance or weight so as to help bias or urge the member 315 in the proper direction in order to insure that the member 315 will return or pivot in the proper manner, as for example when the ticket C is removed from the carriage 122.

Any suitable material can be used for making the various elements or parts, and the parts can be made in different shapes or sizes.

The present invention can be furnished as original equipment on new meters, or else it can be readily installed on existing meters without interfering with the normal operation or use of such meters and the cost and job of installing the present invention on such meters is such that there will be a minimum amount of expense involved and a minimum amount of effort required. In essence it will be seen that the present invention embodies a minimum number of parts, namely the member 315, the member 311, the ball 314, the member 304, and the bar 300. These parts are arranged and constructed so that they will perform in the desired manner and will not readily get out of order even when subjected to abuse and prolonged usage.

The present invention is controlled by the ticket and not by the cranking process. Also the present invention is adaptable to any type of meter such as the Lockheed meter, Rockwell, Veeder-Root, and the Neptune meter, as well as other types or makes of meters. The present invention will thus prevent fraud during delivery as, for example, when fuel oil is being delivered from a truck.

With the present invention the ball 314 can only be joggled or shaken loose when the driver attempts to drive away with the ticket in place. Thus, the ball shakes loose if the driver moves the vehicle with the ticket in the carriage, but when the ticket is removed, the ball cannot jog or shake loose since the member 315 automatically returns to its proper position when the ticket is removed so that the gripping portion 321 will hold the ball 314 properly positioned in its seat 310.

It will now be clear that there is provided a device which accomplishes the objectives heretofore set forth. While the invention has been disclosed in its preferred form, it is to be understood that the specific embodiment thereof as described and illustrated herein is not to be considered in a limited sense as there may be other forms or modifications of the invention which should also be construed to come within the scope of the appended claims.

What is claimed is:

1. In a device of the character described, a carriage for receiving a sales slip, a pair of rocker frame members adjacent said carriage and one of said rocker frame members having a bar affixed thereto, a U-shaped channel member supported by said carriage, said carriage having a recess therein defining a seat, a ball coacting with said bar for selectively engaging said seat, a block affixed to said carriage, and a body member having a portion swivelly mounted in said block, and said body member having an end portion selectively engageable by the sales slip, and the other end of the body member defining a holding element for engaging the ball when the ball is in its seat.

2. The structure as defined in claim 1 and further including a stop pin operatively connected to said channel member for selectively limiting downward movement of the ball when the ball is shaken loose from its seat by movement of the device, as for example when a fuel delivery truck is moved with the sales slip in the carriage.

3. The structure as defined in claim 1 and further including a shoulder on said body member, and a biasing member connected to said shoulder.

4. The structure as defined in claim 1 wherein said body member includes a first straight portion, a second portion arranged angularly with respect to said first portion, a third portion arranged angularly with respect to said second portion and said third portion being swivelly supported by the block, a shoulder on said third portion, a biasing member connected to said shoulder, and said third portion terminating in an offset flattened end portion which has an arcuate formation for selectively engaging the ball.

5. In a tamper-proof meter, a carriage for receiving a sales slip, a channel member supported by the carriage, said carriage having a recess therein defining a seat, a movable member for selectively engaging said seat, a bar for selectively engaging said movable member when the movable member is shaken loose from its seat, and a body member pivotally supported and having an end portion selectively engageable by the sales slip, and said body member also having a portion thereon for engaging the movable member when the movable member is in its seat, and a recording means for operating on the sales slip.

6. A tamper-proof meter comprising a frame including side plates, numbered printing wheels in said frame, a cross head, platen, a carriage having a transverse throat portion, a punch frame, punch pin and rock shaft, said carriage adapted to receive a sales slip, ticket or the like therein, and a pair of rocker frame members; the improvement consisting in an L-shaped bar which is secured to one of the rocker frame members, said bar including an upstanding portion and a lower portion, a U-shaped channel member supported in said carriage and said channel member including a lower portion and upstanding side portions, a stop pin in the lower portion of the channel member, said carriage including a top wall portion which has an indentation therein that defines a seat, a ball selectively engageable with the seat, a block secured to said carriage, a body member including a first straight portion selectively engageable by the sales slip, a second portion arranged angularly with respect to said first portion, a third portion arranged angularly with respect to said second portion, and said third portion being swivelly supported by said block, a shoulder on said third portion, a biasing member connected to said shoulder, and said third portion terminating in an offset flattened end portion for selectively engaging the ball when the ball is in its seat.

7. In a tamper-proof meter, a rocker frame member, an L-shaped bar secured to said rocker frame member, a movable carriage having a channel member supported thereby, and said carriage having a seat therein, a ball for engaging said seat, a block secured to said carriage, a body member swivelly supported by said block, and said body member having a portion engageable by a sales slip in the carriage, a recording means for operating on the sales slip, and said body member also having a portion for engaging the ball when the ball is in its seat.

References Cited by the Examiner
UNITED STATES PATENTS

| | | | |
|---|---|---|---|
| 2,086,363 | 7/37 | McMullen | 346—14 |
| 2,099,129 | 11/37 | McMullen | 235—132 |
| 2,707,577 | 5/55 | Trotter | 235—130 X |

LEO SMILOW, *Primary Examiner.*

LEYLAND M. MARTIN, *Examiner.*